United States Patent
Ebbenga et al.

(10) Patent No.: US 9,156,667 B2
(45) Date of Patent: Oct. 13, 2015

(54) LEVER HANDLE FOR JACK

(76) Inventors: Mark Ebbenga, Forest Lake, MN (US);
Edwin H. Ryan, St. Paul, MN (US);
Mark J. Little, Oakdale, MN (US)

( * ) Notice: Subject to any disclaimer, the term of this patent is extended or adjusted under 35 U.S.C. 154(b) by 966 days.

(21) Appl. No.: 13/220,998

(22) Filed: Aug. 30, 2011

(65) Prior Publication Data
US 2012/0056139 A1 Mar. 8, 2012

Related U.S. Application Data

(60) Provisional application No. 61/378,665, filed on Aug. 31, 2010.

(51) Int. Cl.
| | |
|---|---|
| B66F 15/00 | (2006.01) |
| B62B 5/00 | (2006.01) |
| B66F 3/00 | (2006.01) |
| B66F 19/00 | (2006.01) |

(52) U.S. Cl.
CPC ............... B66F 15/00 (2013.01); B62B 5/0089 (2013.01); B66F 3/005 (2013.01); B66F 19/005 (2013.01)

(58) Field of Classification Search
CPC .......... B66F 15/00; B66F 7/00; B66F 7/0641; B66F 19/00; B66F 19/005
USPC ............ 254/131, 8 R, 120, 132, 113, 9 B, 17, 254/133 R
See application file for complete search history.

(56) References Cited

U.S. PATENT DOCUMENTS

| | | | |
|---|---|---|---|
| 1,286,161 A | 10/1918 | Wagner | |
| 1,362,462 A | 12/1920 | Barker | |
| 1,798,163 A * | 3/1931 | Krenzke | 403/95 |
| 1,826,110 A * | 10/1931 | Wickman | 254/131 |
| 2,196,510 A | 10/1939 | Vutz | |
| 3,298,705 A | 1/1967 | Neaverson et al. | |
| 3,439,764 A * | 4/1969 | Kimball | 180/12 |
| 3,937,479 A * | 2/1976 | Dalton | 280/3 |
| 3,944,259 A | 3/1976 | Miller | |
| 4,210,217 A * | 7/1980 | Lachowicz | 180/13 |
| 4,307,894 A | 12/1981 | Habeshian | |
| 4,588,204 A * | 5/1986 | Reed | 254/131 |
| 4,738,433 A * | 4/1988 | Hoff | 254/30 |
| 4,799,698 A | 1/1989 | Markovic | |
| 5,087,063 A | 2/1992 | Merrill, Jr. | |
| 5,678,804 A * | 10/1997 | Lintelman et al. | 254/131 |
| 6,202,985 B1 * | 3/2001 | Chong et al. | 254/131 |
| 6,520,482 B1 * | 2/2003 | Bigham | 254/131 |
| 7,021,659 B2 | 4/2006 | McGrew | |
| 7,396,034 B2 | 7/2008 | Wilson, Jr. | |
| 7,611,160 B1 | 11/2009 | Ignacio | |
| 2009/0278100 A1 * | 11/2009 | Bowman | 254/8 R |
| 2010/0224842 A1 * | 9/2010 | Hebert | 254/131 |

* cited by examiner

*Primary Examiner* — Lee D Wilson
*Assistant Examiner* — Seahee Yoon
(74) *Attorney, Agent, or Firm* — Westman, Champlin & Koehler, P.A.; Z. Peter Sawicki

(57) ABSTRACT

An apparatus is disclosed for attachment to a jack including a first axle. The apparatus includes a fulcrum wheel disposed on a second axle, the second axle being connected directly or indirectly to the first axle. A lever has a first end connected directly or indirectly to the second axle and a second end having a terminus. A first line intersects the first axle and second axle. A second line intersects the second axle and the lever terminus. The first and second lines meet at an obtuse angle. In another aspect, an apparatus is disclosed including a jack having a first axle, an extension member, and a fulcrum wheel is disposed on a second axle connected to the extension member. A lever has a first end attachable to the extension member proximate the second axle. A method of moving a jack relative to a ground surface is also disclosed.

19 Claims, 8 Drawing Sheets

LEVER HANDLE FOR JACK

CROSS REFERENCE TO RELATED APPLICATION

This application claims the benefit of priority from, and fully incorporates by reference herein, U.S. Provisional Patent Application Ser. No. 61/378,665, filed Aug. 31, 2010.

BACKGROUND

An exemplary prior art jack for a trailer, such as a boat trailer to be towed by a motor vehicle, is shown in FIG. 1. Jack 10 is mounted on horizontal member 12 of boat trailer 14. When trailer 14 is detached from a towing vehicle (not shown), horizontal member 12 is generally supported so that tongue 16 does not rest on the ground. Such support may be accomplished by a structure such as a block or a variable length apparatus that has an easily adjustable height such as jack 10. Jack 10 is especially suitable for raising tongue 16 of horizontal member 12 to the same level as a hitch 18 of the towing vehicle. Jack 10 also typically provides a wheel 20 so that the horizontal member 12 may be moved with respect to the ground surface 22. Crank handle 24 is turned to telescope post 26 within sleeve 28 to thereby raise and lower horizontal member 12 with respect to ground surface 22.

To attach trailer 14 to hitch 18, a driver of the towing vehicle backs the vehicle up to the boat trailer 14 to position hitch 18 as close as possible to ball coupler 30 of trailer tongue 16. However, most vehicle drivers are conservative because hitting the trailer with the vehicle can cause great damage. Accordingly, even with skilled drivers, a distance usually remains between the towing vehicle's hitch 18 and the ball coupler 30 of the trailer 14.

To close this gap, a user must push trailer 14 on jack wheel 20 to position ball coupler 30 over hitch 18. It is to be understood that different coupling mechanisms and hitches may be used that are known in the art. Although jack wheel 20 pivots about post 26 to facilitate this maneuver, it is still a very difficult task because of the weight of trailer 14 (and any boat thereon) and the fact that it is very hard to pivot jack wheel 20 while it bears such considerable weight. A user generally must kick jack wheel 20 in order to turn to in the appropriate direction for bringing ball coupler 30 toward hitch 18. Then the user must push on jack 10 or horizontal member 12 to bring ball coupler 30 to hitch 18.

After placing ball coupler 30 over hitch 18, the user turns crank handle 24 to lower ball coupler 30 onto hitch 18. After ball coupler 30 is secured onto hitch 18, the user turns crank handle 24 to raise jack wheel 20 off ground surface 22. Then the user pulls pin 32 to allow jack 10 to pivot into a horizontal orientation, so that jack 10 is out of the way during trailer transport and storage.

Moreover, another problem is commonly encountered by boat trailer users. After bearing the weight of the trailer for a period of time on a soft ground surface such as gravel, soil, sand or asphalt, the jack wheel 20 may sink into the ground, thereby rendering it difficult to thereafter move the trailer 14. For a trailer hauling a typical boat, the weight of the tongue could be on the order of 500 pounds. Thus, it can be exceedingly difficult for a user to lift horizontal member 12 in order to dislodge jack wheel 20 from its embedded position in the ground. Also, such lifting attempts can result in great back strain and a high likelihood of injury.

Accordingly, the present invention presents an apparatus and method to ease the guidance and maneuvering of a trailer tongue.

SUMMARY

An apparatus is disclosed for attachment to a jack, the jack comprising a first axle. The apparatus comprises a fulcrum wheel disposed on a second axle, the second axle being connected directly or indirectly to the first axle. A lever has a first end connected directly or indirectly to the second axle and a second end having a terminus. A first line intersects the first axle and second axle. A second line intersects the second axle and the lever terminus. The first and second lines meet at an obtuse angle.

In another aspect, an apparatus is disclosed comprising a jack, which in turn comprises a variable length member and a first axle disposed at an end of the variable length member. An extension member has a mechanism for attachment to the first axle. A fulcrum wheel is disposed on a second axle, the second axle being connected to the extension member. A lever has a first end attachable to the extension member proximate the second axle and has a second end opposite the first end.

A method of moving a jack relative to a ground surface comprises connecting a fulcrum wheel to the jack and to a lever, contacting the ground surface with the fulcrum wheel; pushing down on an end of the lever to pivot about the fulcrum wheel to thereby raise the jack above the ground surface, and moving the end of the lever to move the jack relative to the ground surface.

BRIEF DESCRIPTION OF THE DRAWINGS

The disclosed subject matter will be further explained with reference to the attached figures, wherein like structure or system elements are referred to by like reference numerals throughout the several views.

DETAILED DESCRIPTION

The current disclosure describes a jack assembly that includes a lever apparatus. The disclosure is also directed to a foldable lever apparatus that is attachable to a conventional jack. A method of using the assemblies and apparatuses are also described.

Figure 2:
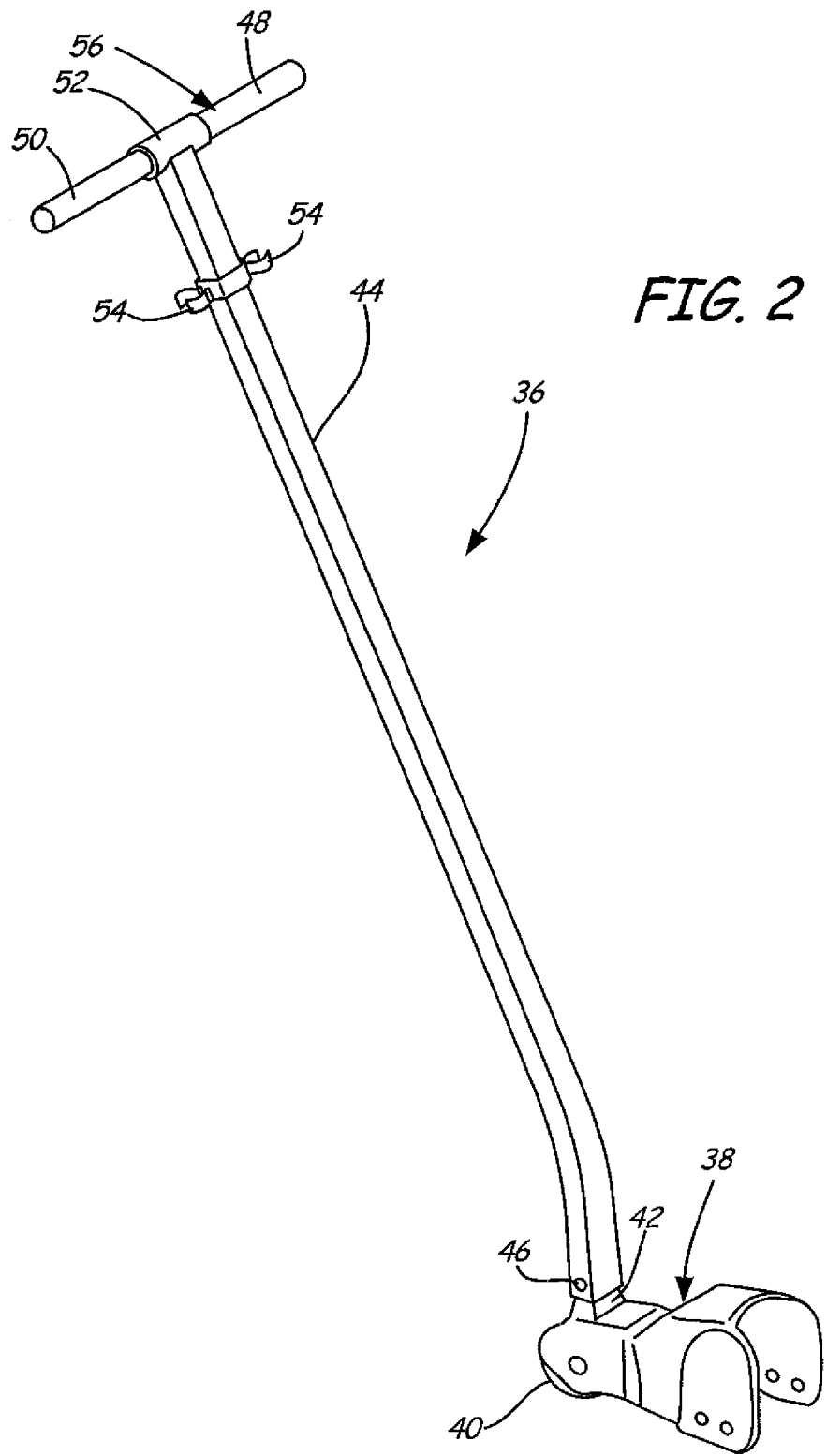
FIG. 2 is a front right perspective view (from the standpoint of a user) of an exemplary lever apparatus of the present disclosure.
Figure 3:
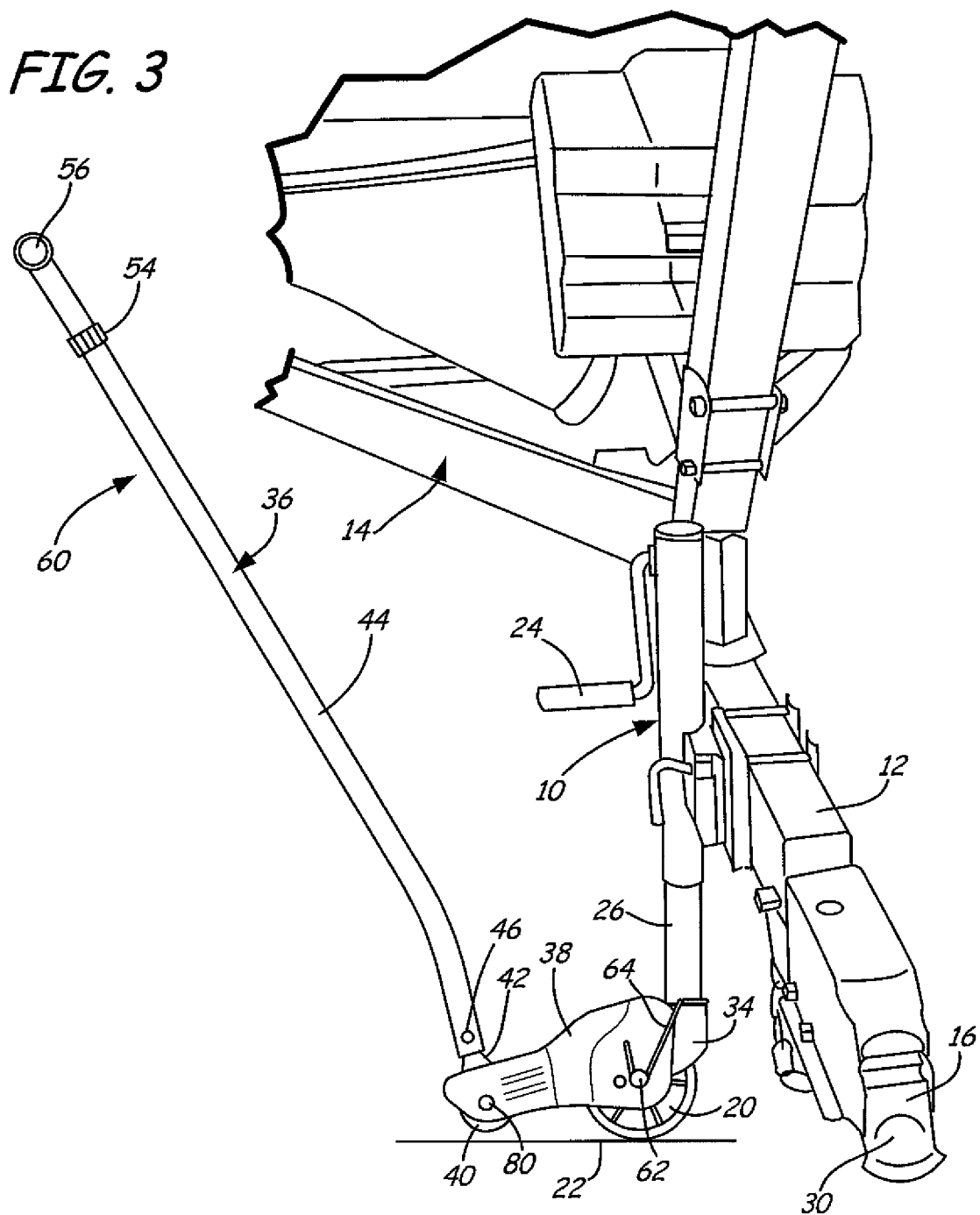
FIG. 3 is a right side elevation view of an exemplary lever apparatus attached to a jack, in an inactive position.
Figure 4:
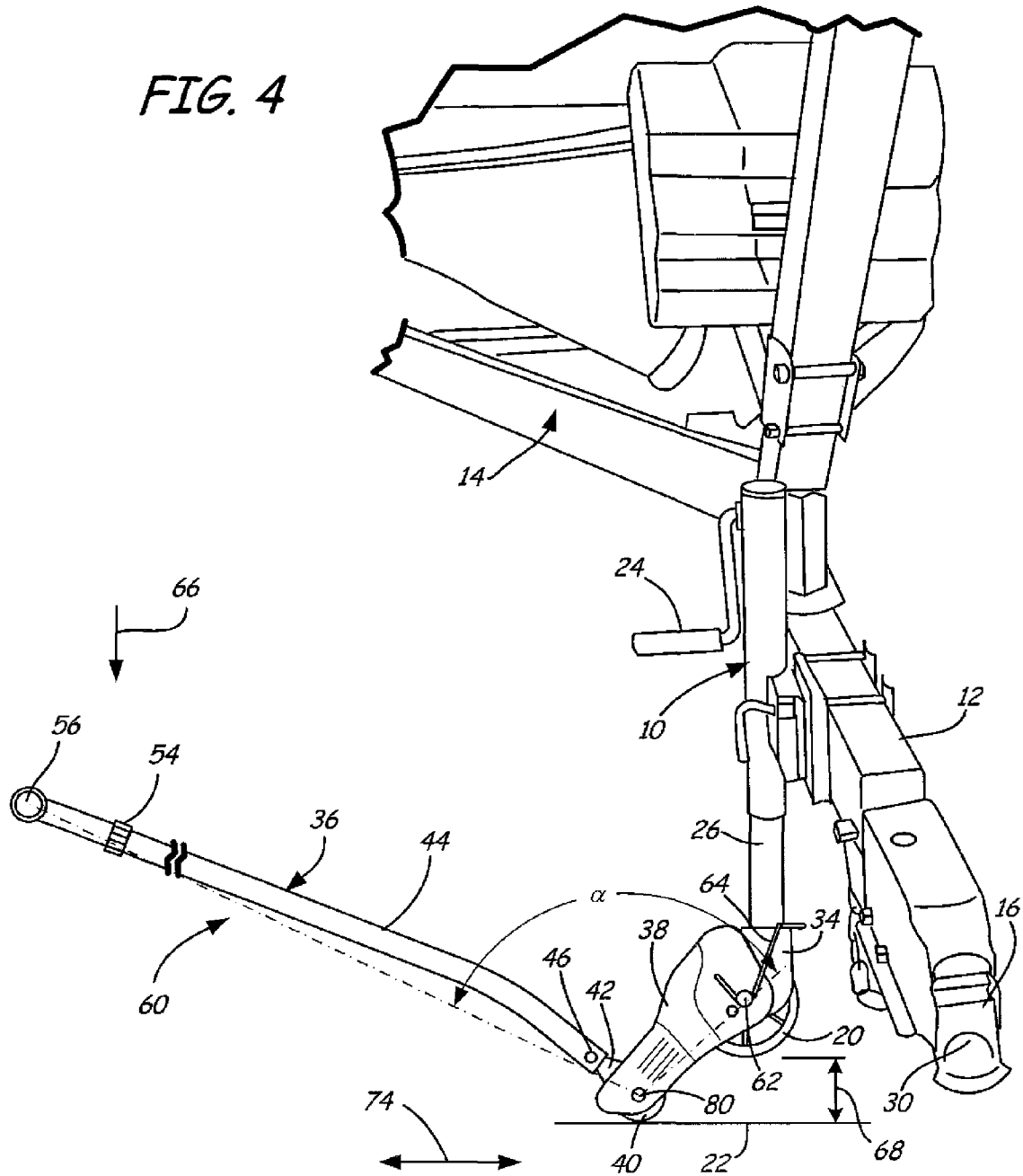
FIG. 4 is a right side elevation view of an exemplary lever apparatus attached to a jack, wherein the lever handle is pushed down to thereby raise the jack wheel.

An exemplary lever apparatus 36 is illustrated in FIG. 2. As illustrated in FIGS. 3 and 4, lever apparatus 36 may be attached to the jack wheel 20 of a conventional jack 10. The lever apparatus 36 illustrated in FIG. 2 includes an extension member extending between and connecting jack wheel 20 and a lever fulcrum wheel 40. The extension member is a shroud 38 that at least partially covers jack wheel 30 and lever fulcrum wheel 40, thereby providing a strong connection therebetween. Stud 42 on shroud 38 allows for removable attachment of lever arm 44 using pin 46. Left handle section 48 and right handle section 50 are removable from handle tube 52 and stowable in holders 54. As assembled, the handle components 48, 50 and 52 form handle 56.

As illustrated in FIGS. 3 and 4, lever apparatus 36 is attached to the axle of jack wheel 20 to form an exemplary jack assembly 60, connected to a trailer such as a boat trailer 14. Shroud 38, including lever fulcrum wheel 40, is semi-permanently attached to jack wheel 20 at its axle by bolt 62 or other suitable fastener. Lever arm 44 is easily attachable to and removable from stud 42 of shroud 38 using pin 46. During transport of trailer 14, lever arm 44 is typically removed from shroud 38 so that jack 10 can be easily pivoted to a horizontal orientation with very little obstruction and weight thereon. When trailer 14 is in place, a user can then easily place the lower end of lever arm 44 onto stud 42 and attach the two components 44 and 42 with pin 46. Wire spring 64 attaches to a hole 82 (see FIGS. 5 and 6) on each side of shroud 38 and wraps around bolt 62 and around post 26. Wire spring 64 is tensioned to automatically lift lever fulcrum wheel 40 slightly off ground surface 22 when no pressure is exerted on lever arm 44. In an exemplary embodiment, a distance between lever fulcrum wheel 40 and ground surface 22 is about 0.5 inch. This slight raising of lever fulcrum wheel 40 enhances steering control because only one of the wheels—either jack wheel 20 or lever fulcrum wheel 40—contacts the ground surface 22 at any time during typical maneuvering of the trailer 14 using jack assembly 60. Moreover, because lever fulcrum wheel 40 is held above the ground surface 22, it is less likely to sink into the ground, thereby remaining unstuck even if jack wheel 20 becomes embedded in the ground.

Since lever arm 44 is attached to shroud 38, handle 56 is positionally fixed with respect to the axle of lever fulcrum wheel 40 and the axle of jack wheel 20. As illustrated in FIG. 4, pushing down upon handle 56 in direction 66 results in a pivot about the axle 80 of lever fulcrum wheel axle 40 that overcomes the spring force of wire spring 64, allowing lever fulcrum wheel 40 to contact the ground and causing jack wheel 20 to lift off the ground by distance 68. With jack wheel 20 thus lifted, interference between jack wheel 20 and ground surface 22 is eliminated. Shroud 38 keeps jack wheel 20 in line with lever fulcrum wheel 40 so they roll in a same direction. A user can easily swing handle 56 in a horizontal rotation plane (as indicated by arc arrows 70 to pivot jack wheel 20 about lever fulcrum wheel 40 illustrated in FIG. 8A) to the desired direction. This method of turning jack wheel 20 is much more effective than the previous method of kicking jack wheel 20 while it is on the ground because there is no ground interference and the lever arm aids in greatly reducing the effective work required of the user. Because of the length of shroud 38, moving handle 56 in the horizontal plane in arc directions 70 not only turns jack wheel 20 about lever fulcrum wheel 40 but also causes small changes in the position of jack wheel 20 (and therefore of tongue 16 of attached trailer 14, as illustrated in FIG. 4) in arc directions 72 with respect to the ground surface 22. A user can thus use such swinging motions to accomplish small positional changes to place ball coupler 30 over hitch 18.

Figure 1:
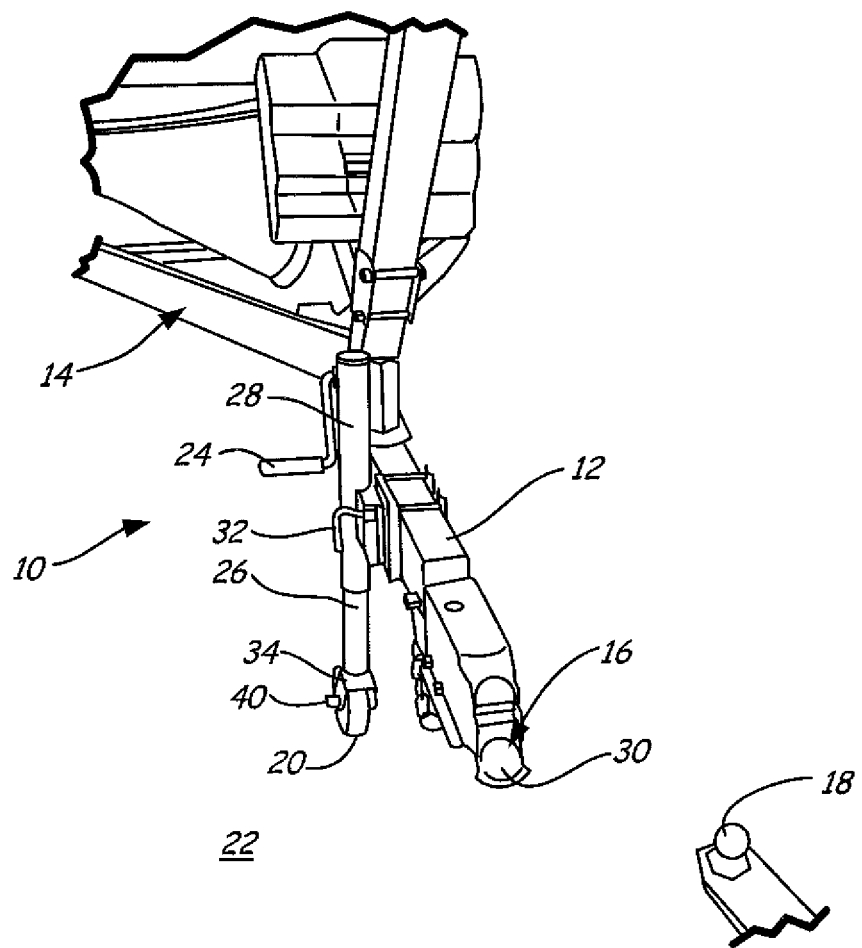
FIG. 1 is a perspective view of a prior art trailer jack in a vertical position on a trailer.

Also referring to FIG. 4, because of the lifting of jack wheel 20, less turning of crank handle 24 of jack 10 is required. The current practice with the prior art jack 10 illustrated in FIG. 1 requires a user to crank handle 24 to raise ball coupler 30 above hitch 18; kick on jack wheel 20 to pivot it to the correct direction; push on trailer 14 to move jack wheel 20 along the ground surface 22 until ball coupler 30 is in place above hitch 18; turn crank handle 24 to lower ball coupler 30 onto hitch 18; and then turn crank handle 24 again to raise jack wheel 20 off the ground so that jack 10 can be pivoted to horizontal storage position.

Figure 7:
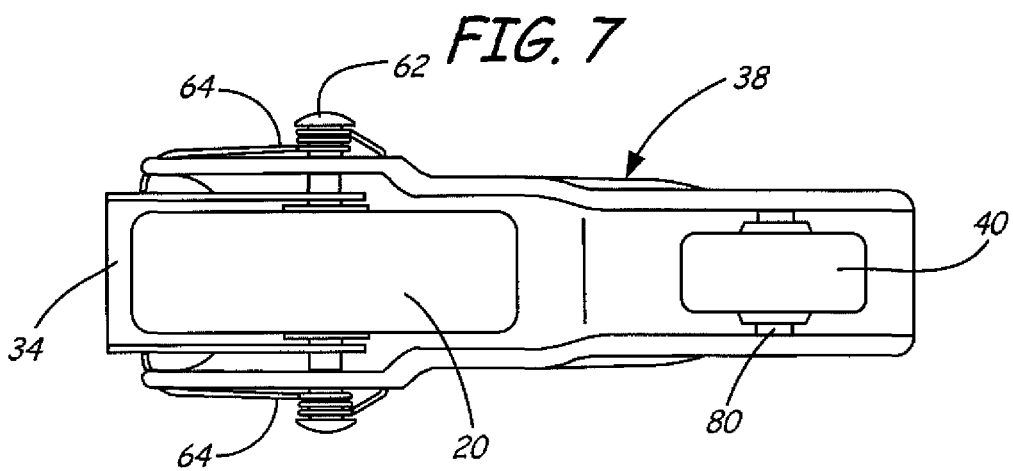
FIG. 7 is a bottom view of the assembly of FIG. 6.

With the jack assembly 60 of the present disclosure, the same result can be much more easily accomplished. A user pushes down on handle 56 in direction 66 to raise jack wheel 20 off the ground and swings handle 56 in directions 70 (illustrated in FIG. 8A) to move jack 10 in directions 72 to change the location and direction of jack wheel 20. If a user desires to move the horizontal member 12 of the boat trailer 14 a greater distance than that afforded by the pivoting action of handle 56 in arc directions 70, the user can also push or pull upon handle 78 in linear directions 74, which are aligned with the travel direction of jack wheel 20 and lever fulcrum wheel 40. As can be seen in FIG. 7, for example, lever fulcrum wheel 40 and jack wheel 20 are aligned to roll in the same direction. Accordingly, one may push or pull upon handle 56 in directions 74 with either jack wheel 20 or lever fulcrum wheel 40 or both wheels 20, 40 in contact with ground surface 22. When ball coupler 30 is has been located over hitch 18, the user releases the downward force on handle 56 to then lower ball coupler 30 onto hitch 18.

Because of the enhanced maneuverability offered to trailer 14 by lever apparatus 36, it is much easier for a towing vehicle driver to position the towing vehicle because the hitch of the vehicle 18 need not be exactly below the ball coupler 30 of the trailer 14. If the hitch 18 is within a short distance of ball coupler 30, the discrepancy can be easily remedied by moving the trailer 14 using the jack assembly 60 as discussed.

At many boat trailer storage and boat launch locations, the ground can be wet or soft or both. When trailer 14 rests on such a ground surface 22, the considerable weight of the trailer 14 often causes the jack wheel 20 to sink into the ground so that it cannot be moved along the surface 22 unless it is lifted out of its rut. In this situation, the user can push down on handle 56 in downward direction 66 in order to lift jack wheel 20 out of its rut so that it can be placed upon ground surface 22 for further positioning.

Obtuse angle alpha ($\alpha$) is fixed by the geometry of shroud 38 and lever arm 44. Obtuse angle alpha is defined as the angle in a vertical plane between 1) a line intersecting bolt 62 at an axle of jack wheel 20 and axle 80 of lever fulcrum wheel 40; and 2) a line intersecting axle 80 of lever fulcrum wheel 40 and a terminus of lever arm 44 at handle 56. In an exemplary embodiment, angle alpha is an obtuse angle at or between about 93 degrees and about 130 degrees. In some embodiments, obtuse angle alpha is at or between about 100 degrees and about 120 degrees. Obtuse angle alpha increases the leverage of lever arm 44 by allowing for a long lever arm 44, wherein the terminus of the lever arm 44 at handle 56 is still low enough for users to easily exert downward force thereon. Obtuse angle alpha also facilitates swinging lever arm 44 under horizontal member 12 of trailer 14 to change the direction of movement. Moreover, the obtuse angle alpha provides clearance between lever arm 44 and jack 10 and horizontal member 12.

Figure 5:
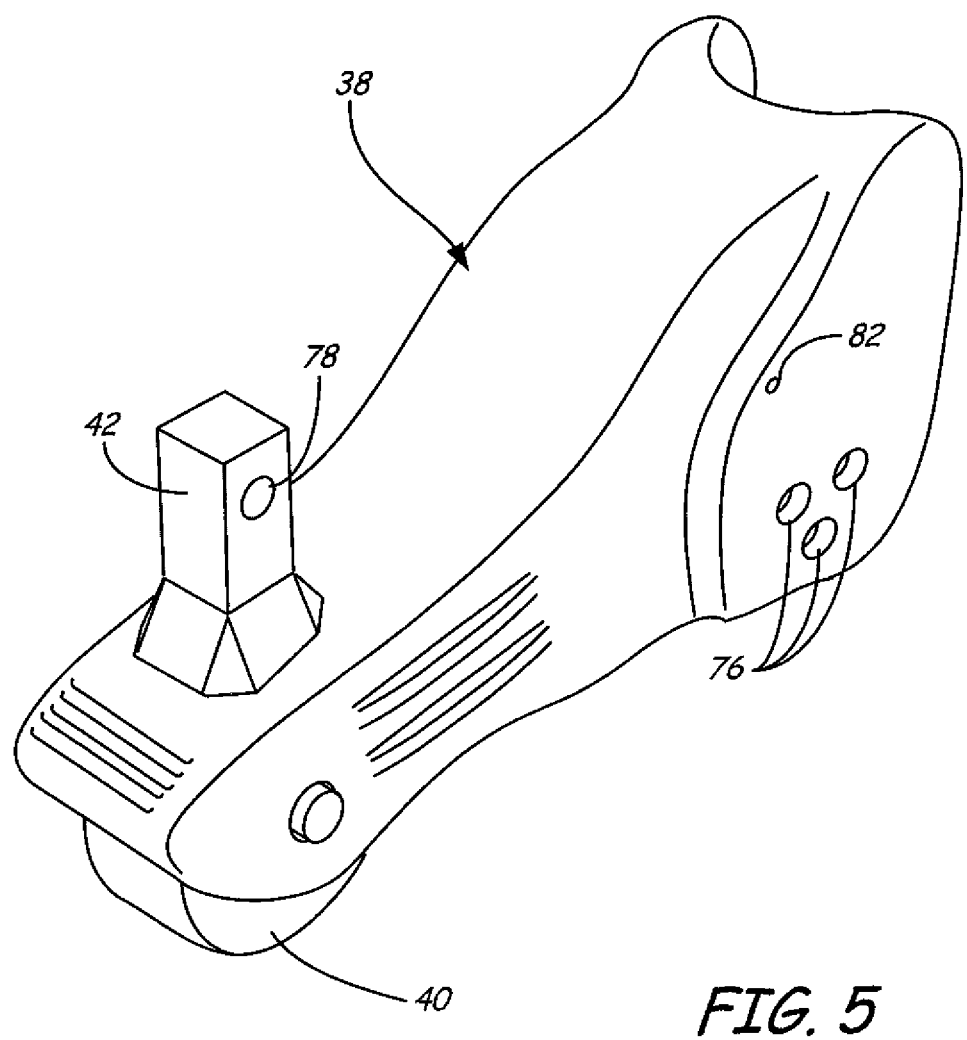
FIG. 5 is a right rear perspective view of an exemplary shroud and fulcrum wheel assembly of the disclosed lever apparatus.

FIG. 5 shows an exemplary shroud 38 for semi-permanent attachment to the jack wheel 20 of a conventional jack 10. Shroud 38 includes a plurality of apertures 76 through which bolt 62 may pass for mounting shroud 38 on jack wheel 20. The various positions of the different apertures 76 allow shroud 38 to accommodate jack wheels 20 of varying diameters. In a typical use, the attachment of shroud 38 to jack wheel 20 is semi-permanent in that once attached, shroud 38 remains on jack wheel 20 during its normal use. However, shroud 38 may be disconnected from jack wheel 20 for use on a different jack 10 or different trailer 14. Stud 42 includes an aperture 78 for attachment of lever arm 44 using pin 46. In an exemplary embodiment, pin 46 is of the quick-release type. The attachment of lever arm 44 to stud 42 is typically temporary in that the lever arm 44 is attached and removed for each use so that it does not add bulk or weight to trailer 14 during transport.

Figure 6:
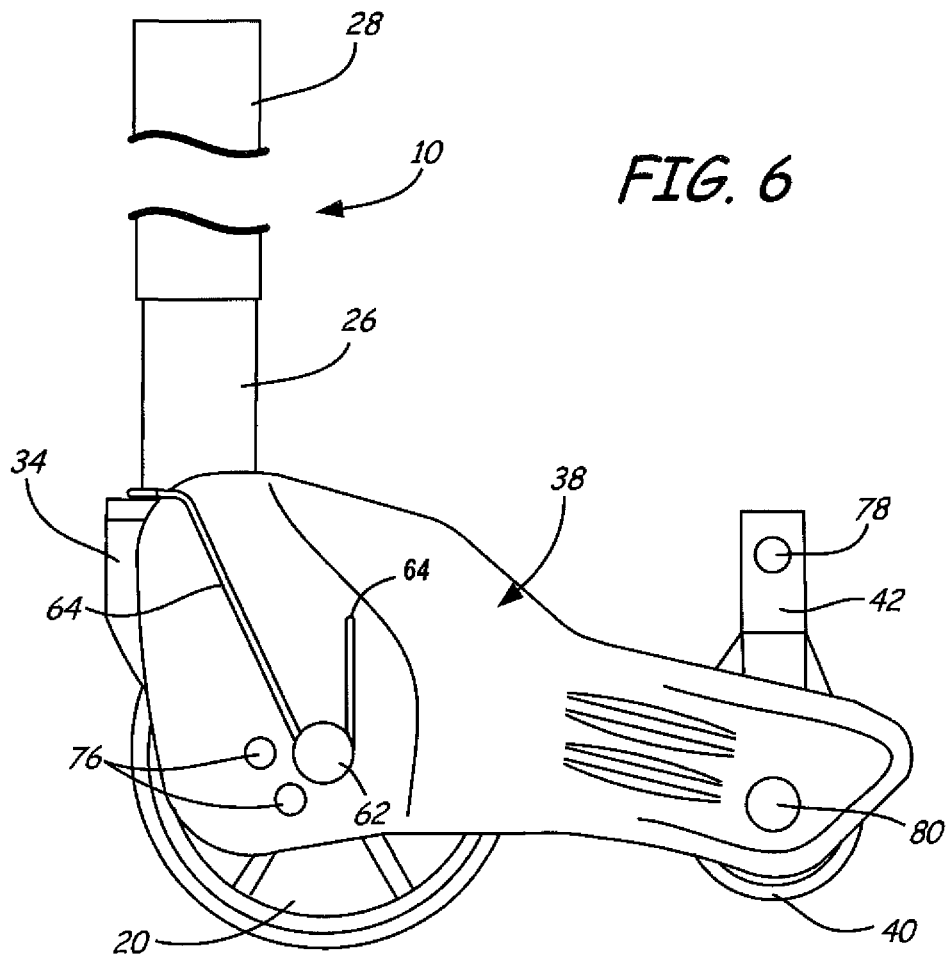
FIG. 6 is a partial left side elevation view of an exemplary shroud and fulcrum wheel assembly attached to a jack.

FIGS. 6 and 7 illustrate side elevation and bottom views, respectively, of shroud 38 attached to jack 10. To attach jack assembly 36 to a conventional jack 20, a user removes the bolt securing jack wheel 20 to jack 10 and places shroud 38 around fork 34 of jack wheel 20. The user wraps pre-shaped wire spring 64 around post 26, positions the spring coils on both sides of the suitable aperture 76, and inserts each end of wire spring 64 into a retention aperture 82 provided on each side of shroud 38. Using a bolt 62 that is longer than the original bolt if necessary, the user attaches shroud 38 to jack wheel 20 by passing the bolt through wire spring 62, apertures 76, fork 34 and jack wheel 20.

Figure 8A:
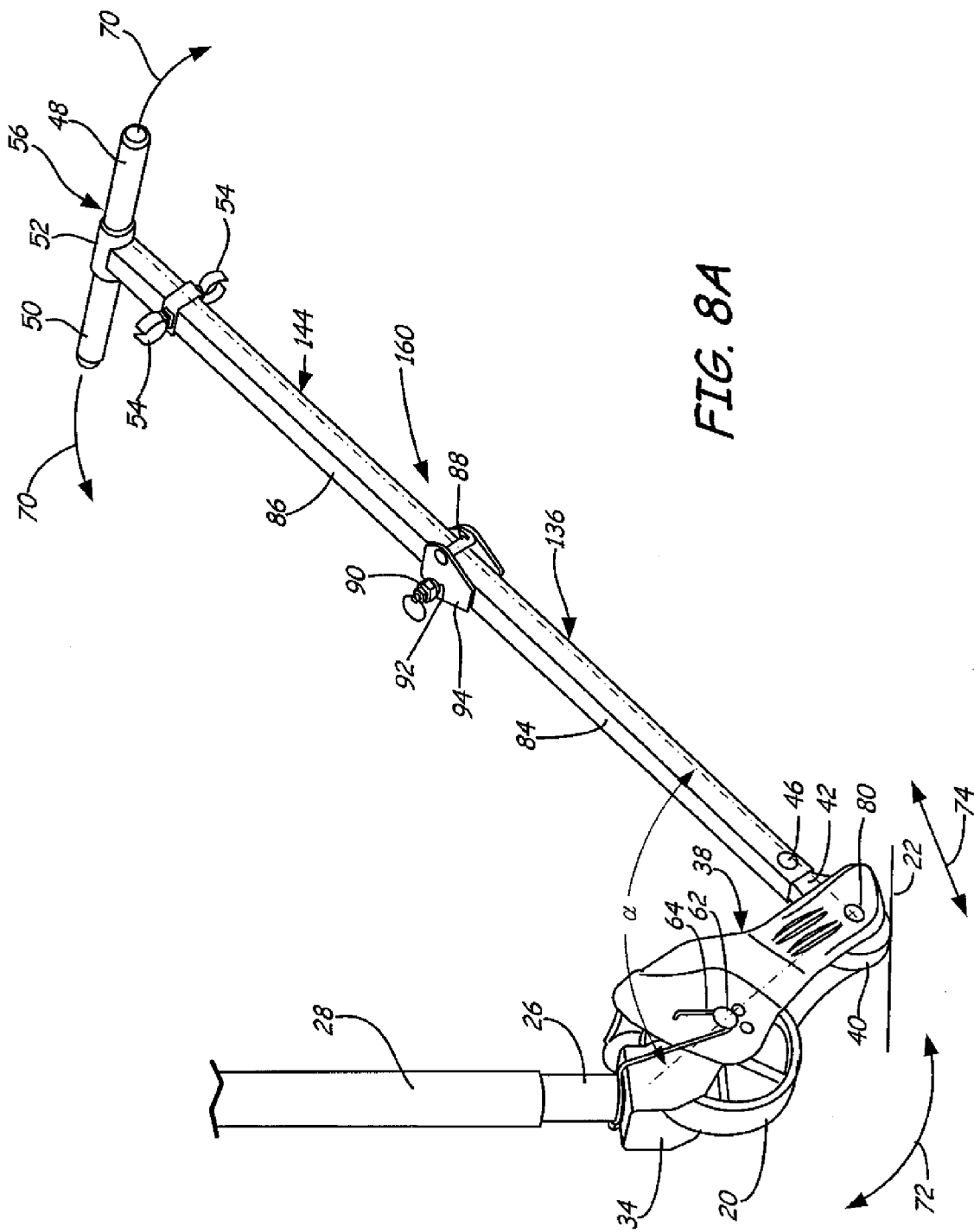
FIG. 8A is a left front perspective view of a second embodiment of lever apparatus attached to a jack, wherein the lever handle is pushed down to thereby raise the jack wheel.

FIG. 8A illustrates a variation of jack assembly 160, which is similar to jack assembly 60 except that lever arm 144 is foldable. The lever arm 144 has lower section 84 and upper section 86 connected at hinge 88. Quick release pin 90 holds lever arm 144 in the straight configuration by passing through apertures 92 of flange 94 and apertures 96 of flange 98. While two sections 84 and 86 are shown, it is contemplated that more sections can also be used. Obtuse angle alpha is maintained whether the lever arm is presented in the foldable straight configuration of lever arm 144 or the bent configuration of lever arm 44.

Figure 8B:
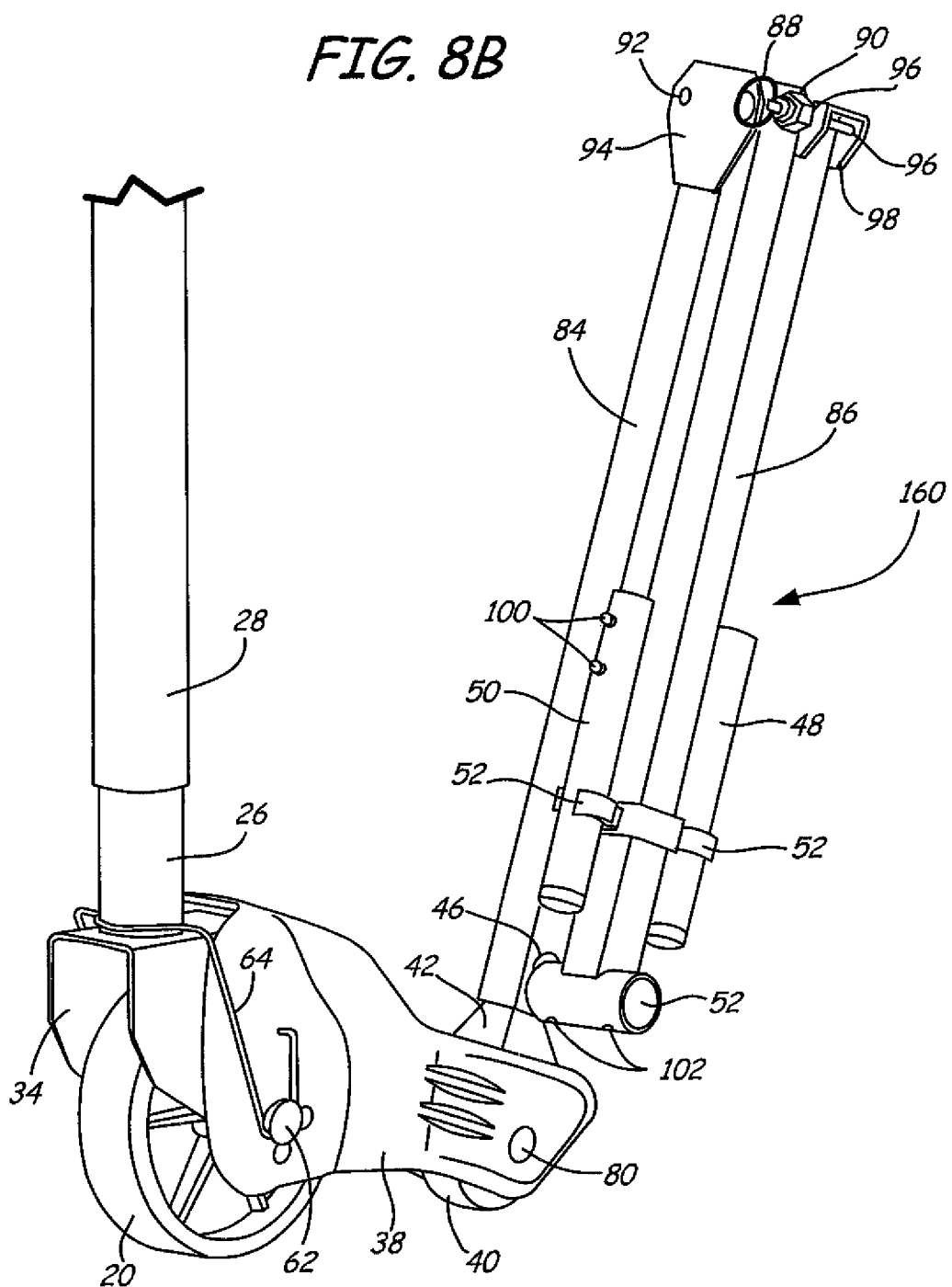
FIG. 8B is a left front perspective view of the lever apparatus of FIG. 8A, wherein the lever handle and arm are in a folded configuration.

To disassemble the handle 56, a handle section 48 or 50 is removed from handle tube 52 by depressing spring buttons 100 at apertures 102 and then sliding each handle section 48, 50 out of handle tube 52. Each handle section 48, 50 is then inserted into a holder 54. In the folded configuration shown in FIG. 8B, jack assembly 160 is much more compact and can be left on trailer 14 if desired. Alternatively, lever arm 144 can be removed from stud 42 by releasing pin 46 for compact storage off shroud 38.

While jack 10 is shown in a marine application in which it has a jack wheel 20, lever apparatus 36, 136 is also usable with a trailer pad, which is typically a jack that has a foot pad, rather than a wheel, in contact with the ground. Particularly suitable trailer pads have a construction similar to jack 10, wherein post 26 is able to rotate within sleeve 28. Moreover, a suitable trailer pad has an axle disposed at a lower end of post 26.

Because users typically install jack 10 about three to four feet from tongue 16 of horizontal member 12, a length of lever arm 44, 144 is generally long enough so that a user can move lever arm 44, 144 under horizontal member 12 without needing to position handle 56 under tongue 16. In one instance lever arm 144, 144 was about 43 inches long and constructed of 2 mm thick tubular steel having a rectangular cross-section measuring about 1 inch thick and about 1.5 to 2.0 inches wide.

An exemplary shroud 38 had an overall length of about 12 inches and a distance between the lever fulcrum wheel axle 80 and the jack wheel bolt 62 of about 7.7 to 9.0 inches. An exemplary shroud 38 also had an overall width of about 3.0 inches and an overall height of about 6.3 inches.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa. Where terms such as above, below, over, under, top, bottom, side, right, left, etc., are used, it is to be understood that they are used only for ease of understanding the description. It is contemplated that structures may be oriented otherwise.

What is claimed is:

1. An apparatus for attachment to a jack, the jack comprising a first axle and a wheel disposed at the first axle, the apparatus comprising:
    a fulcrum wheel disposed on a second axle, the second axle being connected directly or indirectly to the first axle;
    a lever having a first end connected directly or indirectly to the second axle and a second end having a terminus wherein the lever is movable in a horizontal rotation plane about the fulcrum wheel;
    wherein a first line intersects the first axle and second axle and the jack wheel and the fulcrum wheel are linearly aligned along the first line;
    wherein a second line intersects the second axle and the lever terminus;
    wherein the first and second lines meet at an obtuse angle; and
    wherein the lever nay be rushed or pulled with only one of the jack wheel or the fulcrum wheel in contact with a ground surface.

2. The apparatus of claim 1 wherein the jack wheel and the fulcrum wheel are aligned to roll in a same direction.

3. The apparatus of claim 1 wherein the lever comprises a plurality of sections.

4. The apparatus of claim 3 wherein each of the plurality of sections is pivotally connected to at least one other section.

5. The apparatus of claim 4 wherein the second axle is connected to the first axle by a shroud.

6. The apparatus of claim 1 wherein the lever is bent.

7. The apparatus of claim 1 further comprising a wire spring disposed about the first axle.

8. An apparatus comprising:
    a jack comprising:
        a variable length member; and
        a first axle disposed at an end of the variable length member;
    an extension member having a mechanism for attachment to the first axle;
    a fulcrum wheel disposed on a second axle, the second axle being connected to the extension member; and
    a lever having a first end attachable to the extension member proximate the second axle and having a second end opposite the first end wherein the lever is movable in a horizontal rotation plane about the fulcrum wheel.

9. The apparatus of claim 8 wherein the mechanism comprises at least one aperture on the extension member.

10. The apparatus of claim 8 wherein the jack wheel and the fulcrum wheel are aligned to roll in a same direction.

11. The apparatus of claim 8 further comprising a jack wheel disposed at the first axle.

12. The apparatus of claim 11 wherein the extension member is a shroud that at least partially surrounds the jack wheel and the fulcrum wheel.

13. The apparatus of claim 8 further comprising a wire spring disposed about the first axle.

14. The apparatus of claim 8:
 wherein a first line intersects the first axle and second axle;
 wherein a second line intersects the second axle and the second end of the lever; and
 wherein the first and second lines meet at an obtuse angle.

15. A method of moving a jack relative to a ground surface comprising:
 connecting a single fulcrum wheel to the jack and to a lever;
 contacting the ground surface with the fulcrum wheel;
 pushing down on an end of the lever to pivot about the fulcrum wheel to thereby raise the jack above the ground surface; and
 moving the end of the lever to move the jack relative to the ground surface wherein the lever is movable in a horizontal rotation plane about the fulcrum wheel.

16. The method of claim 15 wherein moving the end of the lever comprises swinging the end in an arc.

17. The method of claim 15 wherein moving the end of the lever comprises pulling upon the end.

18. The method of claim 15 wherein moving the end of the lever comprises pushing upon the end.

19. The method of claim 15 further comprising unfolding a plurality of sections to form the lever.

\* \* \* \* \*